US008073324B2

(12) United States Patent
Tsai

(10) Patent No.: US 8,073,324 B2
(45) Date of Patent: Dec. 6, 2011

(54) MAGNET ARRAY FOR COUPLING AND ALIGNING AN ACCESSORY TO AN ELECTRONIC DEVICE

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 12/398,893

(22) Filed: Mar. 5, 2009

(65) Prior Publication Data

US 2010/0225429 A1 Sep. 9, 2010

(51) Int. Cl.
*G03B 11/00* (2006.01)

(52) U.S. Cl. ........................................ 396/544; 359/827

(58) Field of Classification Search .................... 396/71, 396/544, 529; 359/811, 815, 819, 827, 903
See application file for complete search history.

(56) References Cited

U.S. PATENT DOCUMENTS

| | | | | |
|---|---|---|---|---|
| 3,896,463 | A * | 7/1975 | Laskey | 396/544 |
| 5,208,624 | A | 5/1993 | MacKay | |
| 5,708,874 | A * | 1/1998 | Schrock et al. | 396/174 |
| 6,151,206 | A * | 11/2000 | Kato et al. | 361/679.26 |
| 6,889,006 | B2 | 5/2005 | Kobayashi | |
| 7,600,932 | B2 * | 10/2009 | Senba et al. | 396/529 |
| 7,604,423 | B2 * | 10/2009 | Nagata et al. | 396/529 |
| 7,857,526 | B2 * | 12/2010 | Tsujiyama | 396/358 |

FOREIGN PATENT DOCUMENTS

JP 2008076917 A * 4/2008

OTHER PUBLICATIONS

Kimura International, "Conversion Lens for Mobile Phone (with Built-In Camera)", http://www.kimura-intl.com/cellphone_lens.htm, retrieved on Mar. 5, 2009, pp. 1-3.

Magnetic Lenses, "Magnetic Lenses for Point and Shoot Cameras", http://www.magneticlenses.com, retrieved Feb. 16, 2009, p. 1.

Modtown Review, "AmacroX Super Wide Camera Phone Lens", http://modtown.co.uk/mt/review2.php?id _amacroxlens, Feb. 16, 2009, pp. 1-3.

USB Fever Products, "Magnetic/Detachable Wide Angle + Macro Lens for iPhone/Cellphone/NDS", http://www.usbfever.com/index_ eproduct_ view.php?products_ id=789, retrieved Mar. 5, 2009, pp. 1-2.

USB Fever Products, "Magnetic/Detachable Telephoto (2X) Lens for iPhone/HTC/G1/NDS", http://www.usbfever.com/index_ eproduct_view.php?products_id=790, retrieved Mar. 5, 2009, pp. 1-2.

USB Fever Products, "Magnetic/Detachable Fish-Eye Lens for iPhone/Cellphone/NDS", http://www.usbfever.com/index_ eproduct_view.php?products_id=867, retrieved Mar. 5, 2009, pp. 1-2.

* cited by examiner

*Primary Examiner* — Clayton E Laballe
*Assistant Examiner* — Autumn Parker
(74) *Attorney, Agent, or Firm* — Kramer Levin Naftalis & Frankel LLP

(57) ABSTRACT

Systems and methods are providing for aligning an accessory to an electronic device interface. In particular, some accessories such as optical filters and lens require specific alignment to operative properly. Using a first magnet array positioned around the periphery of the interface and a second magnet array positioned within the accessory, a user can position an accessory on the electronic device and rotate the accessory until the magnets of each array exert a force on an opposing magnet of the other array. By distributing the magnets in a manner that includes no repeating segments, only a single alignment of the accessory relative to the interface can allow the magnet arrays to be properly in opposition.

20 Claims, 4 Drawing Sheets

MAGNET ARRAY FOR COUPLING AND ALIGNING AN ACCESSORY TO AN ELECTRONIC DEVICE

BACKGROUND OF THE INVENTION

This is directed to systems and methods for coupling and aligning an accessory to an electronic device. In particular, this is directed to systems and methods for coupling accessories requiring a particular alignment to an electronic device interface, such as optical accessories positioned over a lens.

Electronic devices can include different interfaces by which a user can interact with the device. For example, an electronic device can include one or more input interfaces, such as keys, buttons, or touch screens. In addition, an electronic device can include one or more output interfaces, such a display, audio output circuitry. To further enhance the user's experience, the electronic device can include one or more sensors operative to detect information regarding the user's environment, such as an optical or digital camera lens, light sensor, or other sensing mechanism.

Because the functionality and features of electronic device interfaces can be limited by space and power restrictions, especially in the context of portable electronic devices, a user may wish to couple one or more accessories to the electronic device. An accessory may cooperate with one or more interfaces to enhance the output or detection of the interface. For example, the electronic device can be coupled to an external lens positioned over an internal camera lens to provide a zoom or filter for captured images. As another example, the electronic device can be coupled to an audio dock operative to receive audio provided by output circuitry of the device (e.g., speakers) and redirect the audio output in a particular direction (with or without audio output circuitry in the accessory electrically coupled to the electronic device). As still another example, the electronic device can be coupled to a directional microphone comprising a structure operative to direct received audio to an internal microphone of the electronic device.

Some accessories can require specific alignment with a corresponding electronic device interface to operate properly. For example, optical accessories can include gradient filters for which alignment is important. As another example, an accessory plug operative to engage a corresponding opening in the electronic device can include one or more conductive prongs that must be aligned with associated conductive elements of the electronic device. While in some cases, mechanical alignment mechanisms can be used, the mechanical mechanisms can require complex manufacturing processes, increase the number of parts and therefore the risk of failure, and limit the reduction in size of the electronic device.

SUMMARY OF THE INVENTION

This is directed to a magnet array for coupling and aligning an accessory to an electronic device. In particular, this is directed to a pseudo-random magnet array for coupling an accessory requiring a specific alignment to an electronic device.

To enhance the feature of electronic device interfaces, one or more accessories can be coupled to the electronic device. For example, an optical accessory (e.g., a lens or filter) can be positioned opposite a camera lens of the electronic device. As another example, a directional microphone can be positioned opposite an internal microphone of the electronic device. As still another example, a speaker dock can be positioned adjacent to internal audio output circuitry (e.g., speakers) of the electronic device. Depending on the type of accessory, an electrical connection may or may not be present between the accessory and the electronic device interface. In some embodiments, the accessory may require specific alignment with the electronic device interface to operate properly.

An accessory can be coupled to the electronic device using any suitable approach. To ensure that the accessory is properly aligned with the device interface, the electronic device can include a series of magnets positioned around the periphery of the interface. The magnets can be disposed such that the polarity of the magnets creates a non-repeating pattern. The accessory device can include a corresponding series of magnets positioned adjacent to the portion of the accessory to be placed in contact with the electronic device such that the polarity of the corresponding magnets is the exact opposite of that of the magnets in the device. Because the pattern can be non-repeating, the magnet arrays of the accessory and the electronic device will be properly aligned for only a single orientation or alignment of the accessory relative to the electronic device. The single orientation can ensure that the accessory is properly aligned when it is coupled to the device.

In some embodiments, the magnet arrays of the electronic device and of the accessory can be customized to ensure that the accessory is properly coupled to only an authorized electronic device. For example, the electronic device or accessory can include one or more electromagnets for which the polarity can be selected by changing the direction of current flowing through a coil. As another example, the electronic device or accessory can include one or more permanent magnets that the user can flip within the electronic device. Once the user has selected a personalized polarity distribution of the magnet arrays, unauthorized accessories may not align properly with the electronic device, and the accessory may not be usable with other electronic devices.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
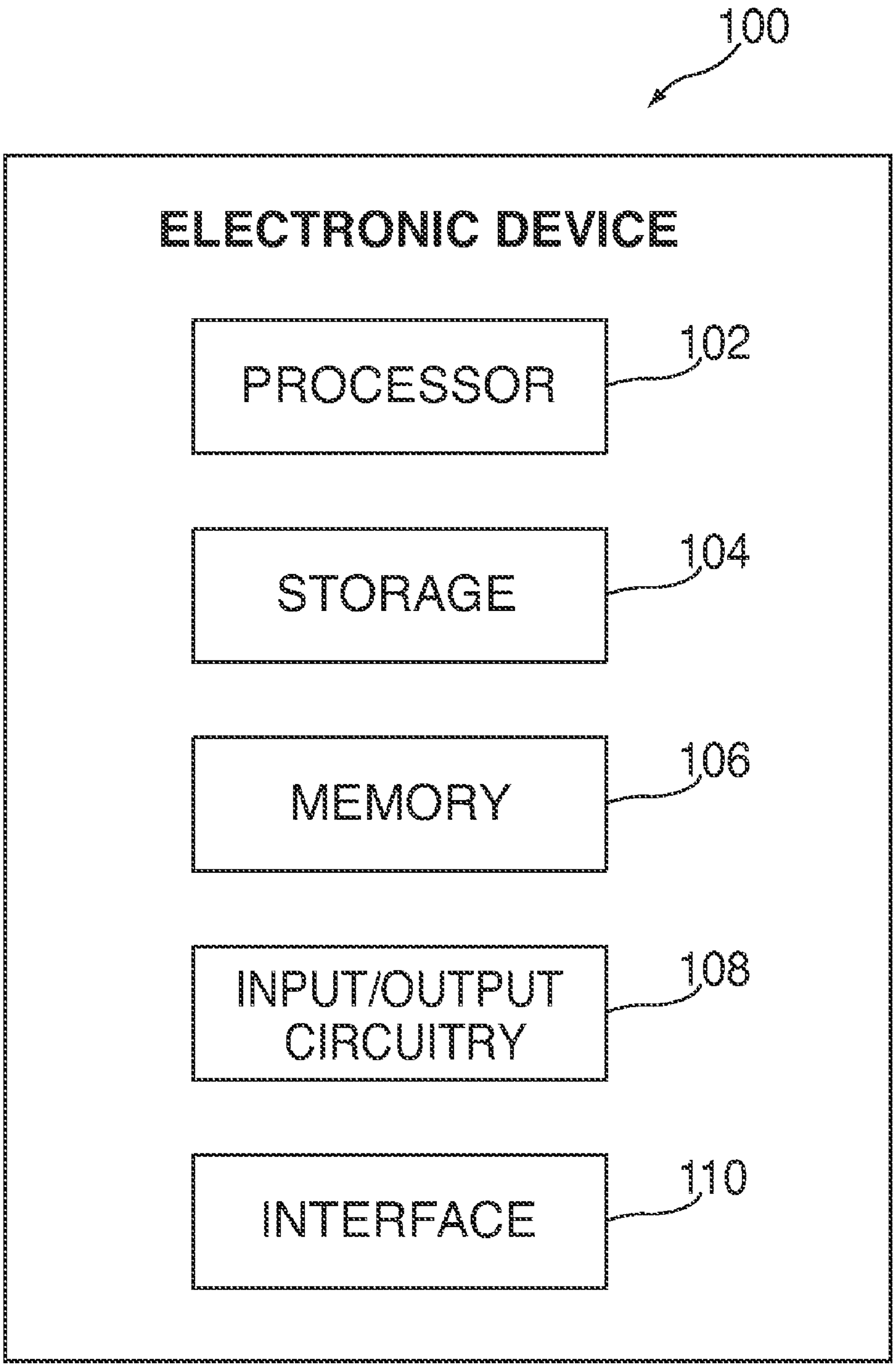
FIG. 1 is a schematic view of an illustrative electronic device to which an accessory may be coupled in accordance with one embodiment of the invention.

This is directed to systems and methods for coupling and aligning an accessory to an electronic device using a combination of magnet arrays positioned within the electronic device and the accessory.

An accessory can be coupled to an electronic device to add features and enhance the use of different electronic device interfaces. For example, an accessory can be electrically coupled to an electronic device port to allow power or data transfers to or from the accessory (e.g., an audio dock or a battery charger). As another example, an accessory can be coupled to the electronic device such that the device is aligned with the electronic device interface but does not share an electrical connection (e.g., a camera lens or filter placed over an internal camera lens of the electronic device).

Some accessories can require specific alignment with the electronic device interface to operate properly. For example, an optical accessory (e.g., a zoom lens or filter) can include a gradient defining an orientation for the accessory (e.g., a filter having a top and bottom). As another example, an accessory can be required to extend from the electronic device interface at a specific angle (e.g., vertical relative to an interface that is surrounded by a curved housing). As still another example, an accessory can include an electrical plug or port operative to engage a corresponding port or plug of the electronic device interface along a particular orientation defined by conductive elements of the port and plug.

To ensure that the electronic device accessory is properly oriented, a series of magnet arrays can be used to allow only one suitable orientation of the accessory relative to the device. In particular, the electronic device can include an array of magnets positioned around the periphery of an interface, such that the polarity of the magnets changes varies in an a-cyclical manner. The accessory can also include an array of magnets positioned along a surface of the accessory placed in contact with the electronic device. The distribution of the array of magnets can be selected such that the magnets of the accessory are all aligned with a corresponding magnet of the electronic device when the accessory is coupled to the electronic device. The polarity of the magnet array of the accessory can vary in a manner exactly opposite that of the electronic device array such that when the accessory is properly coupled to the device, each magnet in the accessory is adjacent to a magnet in the electronic device having the opposing polarity.

To ensure that the accessory is properly aligned, the distribution of polarity in each magnet array can be selected to allow only a single secure orientation of the accessory relative to the electronic device. In particular, the polarity can be selected such that the distribution is not cyclical and asymmetric. For example, a pseudo-random distribution can be used to select the polarity of each magnet in the array. When the distribution is preset for an electronic device, the user can select for purchase only accessories having a corresponding distribution (e.g., purchase accessories based on a series code or serial number).

In some embodiments, a user can set, upon purchasing an electronic device or an accessory, the distribution of the magnet polarities. For example, one or more of the magnets can include an electromagnet for which a user can select the direction in which current will flow (and thus the polarity). As another example, one or more of the magnets can include permanent magnets that the user can flip to change the polarity to which an accessory is exposed. As still another example, the electronic device can include a combination of static magnets and a movable ring of magnets that a user can rotate by any suitable amount to create a unique magnet and polarity pattern. The user can set the polarity distribution using any suitable approach, including for example from a menu or setup screen of the electronic device, by coupling an accessory designed to set the magnet polarity to the electronic device (e.g., a series of magnets of known polarity), or any other suitable approach. Once the polarity of the electronic device is set, the user can enable a setup mode for the accessory and position the accessory over the electronic device magnet array to define the polarity of the accessory magnet array. By defining personalized distributions of polarity for both a user's electronic device and accessories, a user can increase the probability that a stolen accessory will not work with an unauthorized electronic device, and conversely that other accessories will not work with a stolen electronic device.

In addition to ensuring proper alignment of an accessory, a magnet array can also serve as a coupling mechanism for attaching an accessory to an electronic device. For example, one or more magnets of the magnet array can be selected to provide a magnetic force sufficient to retain an accessory coupled to an electronic device (e.g., two or more permanent magnets for coupling, and two or more electromagnets for alignment). As another example, the size and distribution of magnets can be selected to both align and retain an accessory device to the electronic device. The magnets can be selected based on a maximum expected size or weight of accessories to couple to the electronic device. To release an accessory, a user can twist or rotate the accessory to offset the magnets of each magnet array and reduce the magnetic force retaining the accessory. Alternatively, an electronic device can include one or more mechanical coupling mechanisms for coupling an accessory to the electronic device. Suitable coupling mechanisms can include, for example, one or more mechanical fasteners (e.g., a screw), clips, an adhesive, hook and fastener material (e.g., Velcro), latches, bands, or any other suitable fastener.

In some embodiments, each accessory can be mechanically coupled and aligned to the electronic device via a mechanical connector (e.g., a connector having a mechanism such as that used to connect camera lens to reflex camera bodies). The mechanical connector, in turn, can be coupled and aligned to the electronic device via a magnet array. In particular, the electronic device can include a magnet array positioned adjacent to or surrounding an interface, and a corresponding magnet array in the mechanical connector.

FIG. 1 is a schematic view of an illustrative electronic device to which an accessory may be coupled in accordance with one embodiment of the invention. Electronic device 100 can include any suitable type of electronic device operative to display information to a user while detecting movement of the device. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device capable of being moved by the user.

Electronic device 100 can include a processor or control circuitry 102, storage 104, memory 106 input/output circuitry 108, and interface 110, as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., positioning circuitry), or electronic device 100 can include several instances of the components shown in FIG. 1. For the sake of simplicity, only one of each of the components is shown in FIG. 1.

Interface 110 can include one or more interfaces for providing inputs to an electronic device, receiving information or data from an electronic device, or detecting information regarding the environment of the electronic device. For example, interface 110 can include audio output circuitry such as speakers. As another example, interface 110 can include circuitry or a component for detecting light or audio waves from the environment (e.g., a microphone or a camera or lens operative to record images or video of the device environment). As still another example, interface 110 can include an internal antenna for receiving data signals over a communications network. As yet still another example, interface 110 can include an electrical port for transferring one or both of data and power to or from the electronic device (e.g., transfer data to a host device or to an accessory).

Figure 2:
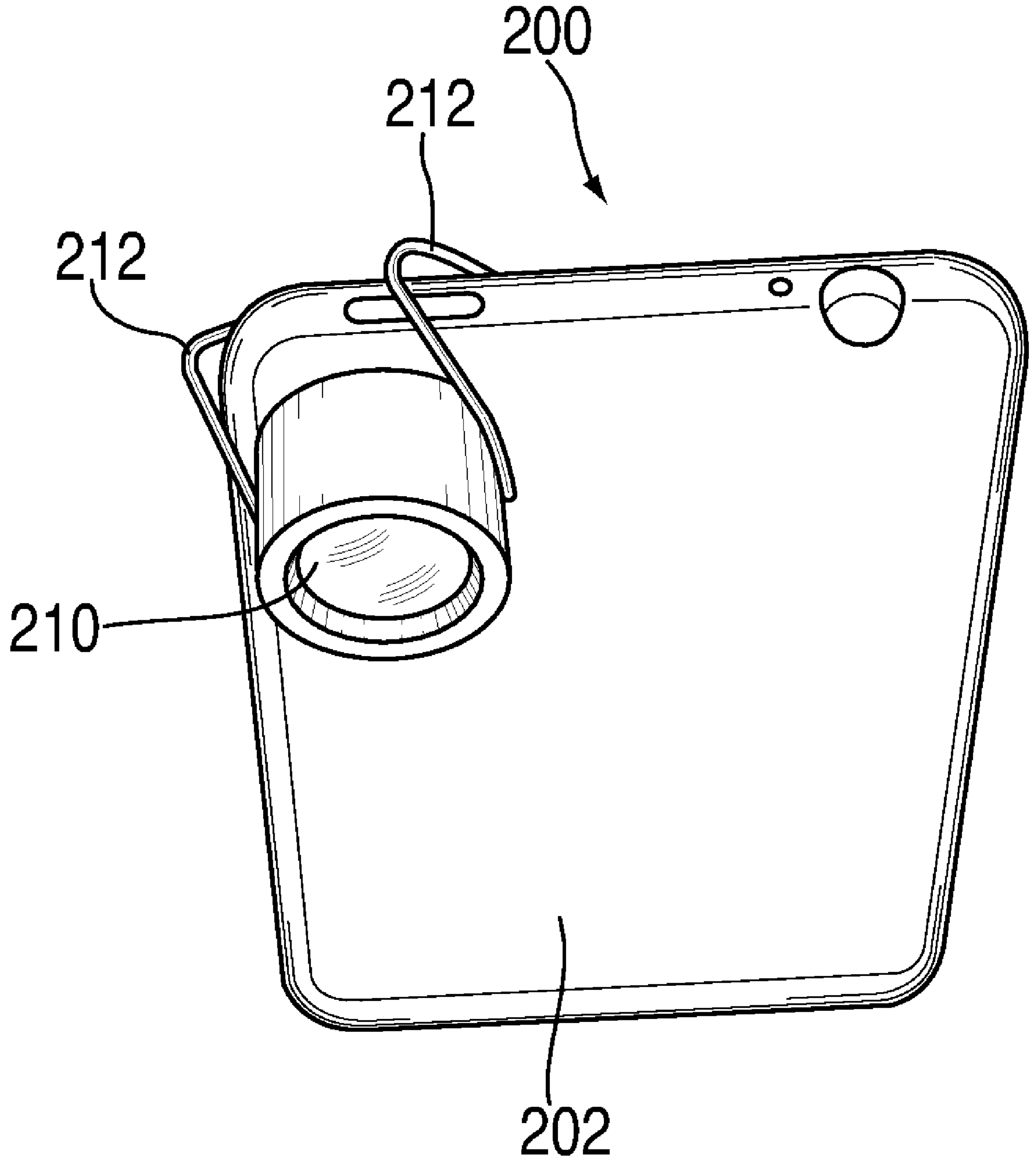
FIG. 2 is a schematic view of an optical accessory coupled to an electronic device in accordance with one embodiment of the invention.

A user can enhance the functionality of an electronic device by connecting one or more accessories to the device. Different approaches can be used to couple the accessory to an electronic device. For example, one or more mechanical fasteners, clips, adhesives, hook and fastener material (e.g., Velcro), latches, bands, or other fasteners can be used to connect the accessory to the electronic device. FIG. 2 is a schematic view of an optical accessory coupled to an electronic device in accordance with one embodiment of the invention. Electronic device 200 can include housing 202 to which optical accessory 210 can be coupled. Accessory 210 can be positioned at any suitable position on housing 202, including for example opposite an internal camera lens of electronic device 200, such that accessory 210 complements or enhances the functionality of the internal camera lens. To retain accessory 210 in place, clips 212 can be placed around housing 202 (e.g., around at least one edge of housing 202). The shape, length and specific positioning of clips 212 can be selected based on the specific accessory 210, the shape of housing 202, and the desired or required position of accessory 210 on electronic device 200.

Some accessories can require specific alignment with the electronic device. For example, accessory 210 can operate only when properly aligned with a camera lens of electronic device 200. It may be difficult, however, to properly position accessory 210 if housing 202 has an irregular shape (e.g., curved surfaces) as the accessory can slip or slide, or not extend from housing 202 from a proper angle (e.g., orthogonal relative to the camera lens). In addition, the shape of electronic device 200 and housing 202 may make the use of clips or other mechanical fasteners difficult (e.g., curve surfaces not optimized for receiving clips, or accessory devices positioned at a distance from edges of the device).

Figure 3:
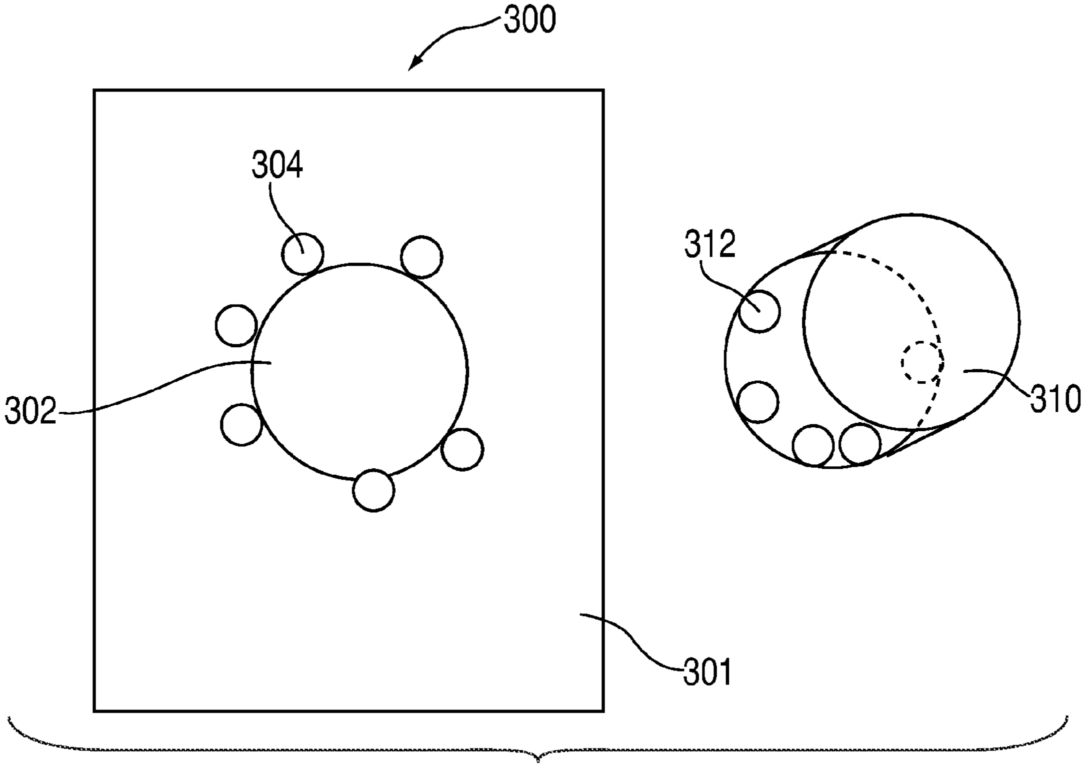
FIG. 3 is a schematic view of an electronic device and an accessory coupled using an illustrative magnet array in accordance with one embodiment of the invention.

As an alternative approach for at least aligning an accessory to the electronic device (and perhaps coupling the accessory to the electronic device), a magnet array can be used. FIG. 3 is a schematic view of an electronic device and an accessory coupled using an illustrative magnet array in accordance with one embodiment of the invention. Electronic device 300 can include port 302 in housing 301. Port 302 can include an opening in the housing through which one or more interfaces can provide or receive information. For example, port 302 can provide an opening for a camera lens, an electronic connector (e.g., a 30-pin or a USB connector), audio output circuitry (e.g., speakers), a sensing mechanism, or any other suitable interface. Accessory 310 can be positioned over port 302 to enhance the use or features of the interface positioned within port 302. To align accessory 310 precisely around port 302, first magnet array 304 can be positioned around the periphery of port 302. Magnet array 304 can include any suitable number of magnets oriented in any suitable manner. For example, magnet array 304 can include at least one magnet for aligning accessory 310 relative to port 302. As another example, magnet array 304 can include several magnets for ensuring a reduced number of orientations of accessory 310 relative to housing 301.

To ensure that accessory 310 is properly coupled to housing 301, accessory 310 can include second magnet array 312. The magnets of magnet array 312 can be positioned such that the magnets of magnet array 312 are lined up with the magnets of magnet array 302 when accessory 310 is properly positioned and aligned relative to housing 301. The polarity of the magnets of magnet array 312 can be selected and distributed to be opposite those of magnet array 302. By appropriately selecting one or both of the physical distribution and polarity of the magnets in each magnet array, a user can ensure that only a single orientation of the accessory allows the magnets of one array to be positioned opposite an opposing magnet of the other array.

Magnet array 312 can be positioned along any suitable surface of accessory 310. For example, magnet array 310 can be positioned adjacent to a surface of accessory 310 that will come in contact with housing 301. As another example, magnet array 312 can be embedded within the body of accessory 310 (e.g., within a side wall of accessory 310, or within a ring positioned around the periphery of accessory 310).

Figure 4A:
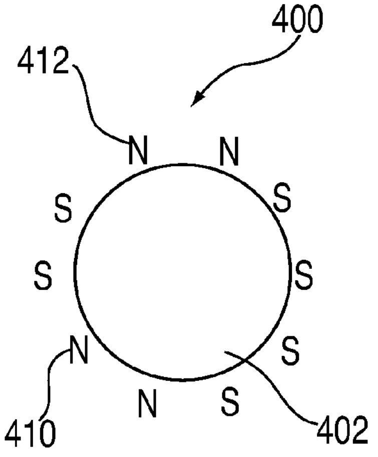
FIG. 4A is a schematic view of an illustrative magnet polarity distribution in accordance with one embodiment of the invention.

To ensure that the orientation of accessory 310 relative to housing 301 is correct, the polarity of the magnets of magnet arrays 304 and 312 can vary in any suitable manner. For example, the polarity of the magnets can vary such that no pattern repeats, or such that the polarity distribution can be asymmetrical. FIG. 4A is a schematic view of an illustrative magnet polarity distribution in accordance with one embodiment of the invention. Distribution 400 can include magnet array 410 surrounding interface 402. Magnets 412 of magnet array 410 can be substantially equally distributed around the periphery of interface 402. To ensure that only appropriate orientations of the accessory are possible, the distribution of the polarity of magnets 412 can include at least one unique segment. For example, magnet array 410 can include at least one non-repeating pattern (e.g., four consecutive S magnets), an asymmetrical pattern, or any other pattern that allows only a limited number of orientations of the accessory when it is coupled to the electronic device.

Figure 4B:
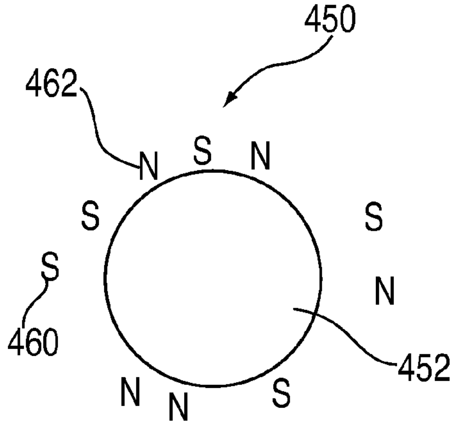
FIG. 4B is a schematic view of an illustrative magnet distribution in accordance with one embodiment of the invention.

In some embodiments, the physical distribution of the magnets can vary. FIG. 4B is a schematic view of an illustrative magnet distribution in accordance with one embodiment of the invention. Distribution 450 can include magnet array 460 surrounding port 452. Magnets 462 of magnet array 460 can be distributed around the periphery of port 452 using any suitable approach. In some embodiments, magnets 462 can be distributed along a circle centered around port 452 at different intervals (e.g., the angle between adjacent the magnets relative to the center of port 452 can vary). Instead or in addition, magnets 462 can be distributed at different distances from the center of port 450. For example, magnets 462 can be distributed along several shapes (e.g., rectangle, oval, triangle, or other polygonal shape) centered around the center of port 450.

Because some accessories or electronic devices can be expensive, a user may wish to personalize one or both of the electronic device and accessory to reduce the risk of theft. In particular, a user may wish to define a personalized magnet array such that accessories authorized accessories to work with the user's electronic device may not properly couple or be aligned with unauthorized electronic devices not owned by the user. The user can personalize the magnet array of the electronic device using any suitable approach. In some embodiments, a user can define the polarity of one or more magnets of the array. For example, a user can select the direction of current for one or more electromagnets to set the polarity of the electromagnets. As another example, a user can mechanically flip one or more permanent magnets (e.g., using an appropriate setup mechanism embedded within or external to the electronic device).

Figure 5:
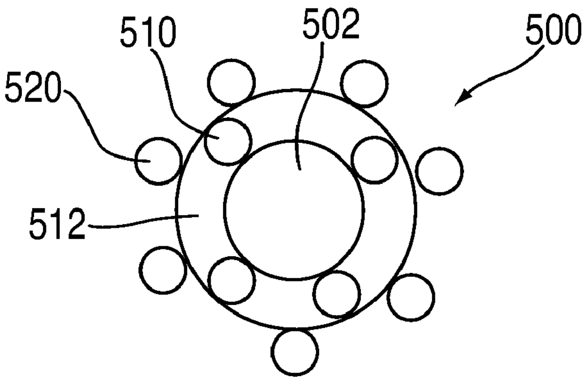
FIG. 5 is a schematic view of an illustrative magnet array that can be personalized in accordance with one embodiment of the invention.

In some embodiments, a user can instead or in addition define the physical distribution of magnets within the magnet array. FIG. 5 is a schematic view of an illustrative magnet array that can be personalized in accordance with one embodiment of the invention. Magnet array 500 can be positioned around the periphery of port 502. To allow the user to change the physical distribution of magnets, array 500 can include first set 510 of magnets and second set 520 of magnets, where the magnets of each of sets 510 and 520 are positioned at different distances from the center of port 502. The user can personalize the magnet distribution by moving one or more magnets from each of sets 510 and 520. For example, the user can select individual magnets to displace. As another example, the user can move one entire set relative to the other entire set (e.g., rotate ring 512 enclosing set 510). The other set can then either remain static relative to port 502, or can also be moved to further personalize the magnet distribution. In some embodiments, sets of magnets can be removed from the electronic device or accessory, and replaced after moving one or more magnets to change the set distribution (e.g., to change the position of a set of magnets defining a shape that cannot be rotated).

Any suitable approach can be used to ensure that a new accessory works properly with a personalized magnet array or with a magnet array that varies with different models of an electronic device. For example, if only a few variations of the magnet array exist (e.g., the user can only vary the polarity of a limited number of electromagnets or an electronic device is sold with varying magnet array polarity distributions), the user can purchase accessories designed to work with the specific variation of magnet array. The accessory packaging or documentation can specify a corresponding array, and specific electronic device magnet arrays that are operable with the accessory (e.g., purchase an accessory based on an electronic device serial number that is associated with a magnet distribution).

In some embodiments, a user can instead or in addition set the magnet array distribution of an accessory after purchase. For example, the user can position the accessory on the electronic device and enable a setup process (e.g., release one or more mechanical catches, or vary current provided to one or more electromagnets) to set the magnets of the accessory to be aligned with and oppose those of the electronic device. Using the setup process, the user can set one or both of the polarity of the electronic device and the physical distribution of magnets of the electronic device.

Figure 6:
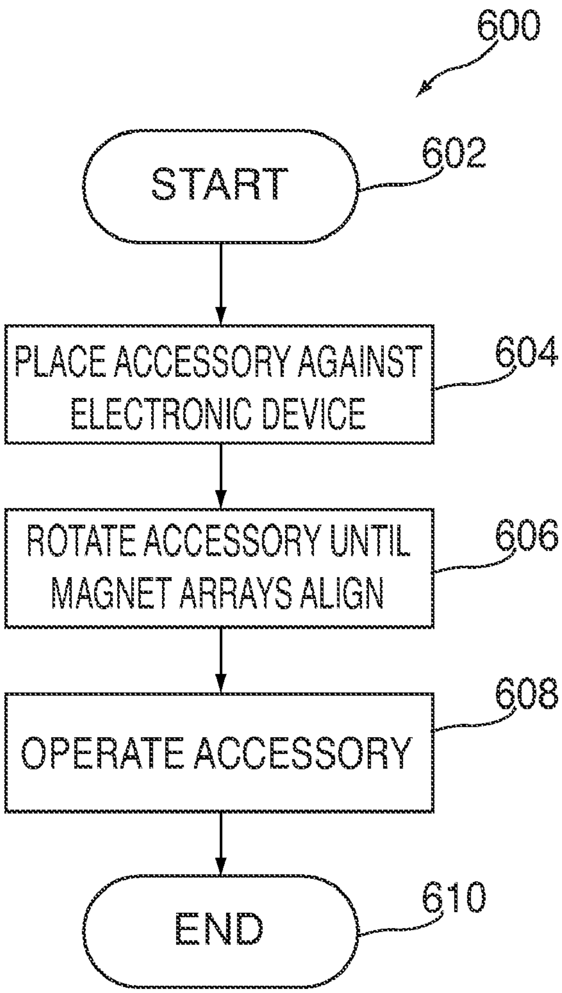
FIG. 6 is a flow chart of an illustrative process for aligning an accessory with an electronic device using a magnet array in accordance with one embodiment of the invention.

The following flow chart describes an illustrative process used to couple an accessory to an electronic device in accordance with one embodiment of the invention. FIG. 6 is a flow chart of an illustrative process for aligning an accessory with an electronic device using a magnet array in accordance with one embodiment of the invention. Process 600 can begin at step 602. At step 604, an accessory can be positioned adjacent to an electronic device. For example, an accessory can be placed against or coupled to an interface of the electronic device. The accessory can be coupled to any suitable interface, including for example an interface for receiving a user input, providing an output to the user, or detecting information regarding the user's environment. In some embodiments, the accessory can include an optical accessory operative to be positioned adjacent to a camera lens of the electronic device.

To operate properly, the accessory may need to be aligned relative to the interface in a particular manner. For example, the accessory may need to be aligned in a manner that allows light to reflect equally to the camera lens. As another example, the accessory may include several conductive portions, all of which need to connect to corresponding portions of an electronic device port. At step 606, the accessory can be rotated or re-positioned on the electronic device until magnets in arrays located in both the accessory and the electronic device are aligned. Once properly aligned, magnets from each of the magnet arrays can exert an attraction force on a corresponding magnet of the other array to retain the alignment of the accessory. At step 608, the accessory may be operated. For example, an optical accessory can filter or gather more light for the camera lens. Process 600 can then end at step 610.

The above described embodiments of the invention are presented for purposes of illustration and not of limitation, and the present invention is limited only by the claims which follow.

What is claimed is:

1. An accessory operative to be coupled to an authorized portable electronic device having an interface, comprising:
- a body comprising a first surface operative to be positioned adjacent to the interface when the accessory is coupled to the authorized electronic device;
- a coupling mechanism for securing the accessory to the authorized electronic device, wherein an orientation of the body can be positioned in any one of at least two different orientations; and
- a magnet array incorporated in the body and placed adjacent to the first surface, wherein:
  - the magnet array comprises a plurality of magnets that align with opposing magnets of the authorized portable electronic device to limit the orientation of the body to only one of the at least two different orientations when the accessory is secured to the electronic device by the coupling mechanism, and
  - the orientation of at least one magnet of the magnet array is selected by the user to prevent the accessory from being coupled to an unauthorized device.

2. The accessory of claim 1, wherein:
- the accessory further comprises a component operative to interact with the interface, wherein the component is secured within the body; and
- wherein the magnet array is positioned adjacent to the accessory component.

3. The accessory of claim 2, wherein:
- the plurality of magnets are distributed along a defined shape surrounding a periphery of the accessory component.

4. The accessory of claim 1, further comprising:
- a movable receptacle positioned adjacent to the first surface, wherein at least one of the plurality of magnets is positioned within the movable receptacle.

5. The accessory of claim 4, wherein:
- the plurality of magnets are symmetrically distributed within the accessory.

6. The accessory of claim 1, wherein:
- the plurality of magnets are distributed in a manner that comprises no repeating pattern of magnet positions.

7. The accessory of claim 6, wherein:
- the position of at least one of the plurality of magnets is changeable.

8. The accessory of claim 1, further comprising:

an attachment mechanism for coupling the accessory to the electronic device interface.

9. An electronic device operative to receive an accessory, comprising:

a housing operative to retain electronic device components;

an interface within the housing operative to allow interactions between the electronic device and the environment; and a magnet array positioned within the housing and around the periphery of the interface, the magnet array comprising a plurality of magnets wherein the orientation of at least one magnet can be selected by a user to create a unique pattern of polarity for the plurality of magnets corresponding to a unique pattern of polarity of a second magnet array of the accessory.

10. The electronic device of claim 9, wherein:

the interface is operative to cooperate with an accessory coupled to the electronic device.

11. The electronic device of claim 10, wherein:

the second magnet array comprises a plurality of magnets, wherein each magnet of the second magnet array is positioned over a corresponding magnet of the magnet array of the electronic device when the accessory is coupled to the electronic device.

12. The electronic device of claim 11, wherein:

the polarity of each magnet of the second magnet array is selected to be opposite the polarity of the corresponding magnet of the magnet array of the electronic device.

13. The electronic device of claim 12, wherein:

the polarity of each magnet of the second magnet array is selected to ensure a specific alignment of the accessory relative to the electronic device interface.

14. The electronic device of claim 9, wherein:

the interface comprises an optical lens.

15. The electronic device of claim 9, wherein:

the at least one magnet comprises at least one electromagnet for which the direction of current can be changed.

16. The electronic device of claim 9, wherein:

the at least one magnet comprises at least one permanent magnet that can be flipped.

17. A method for constructing an optical accessory, comprising:

providing a body comprising a coupling mechanism adjacent to a first surface, wherein the first surface is operative to be positioned adjacent to a surface of an electronic device;

providing an optical component within the body, wherein the optical component is operative to be aligned with an optical interface of the electronic device;

incorporating a magnet array in the body adjacent to the first surface, wherein:

the magnet array comprises a plurality of magnets distributed such that the plurality of magnets are aligned with opposing magnets of the electronic device only for a single orientation of the accessory relative to the electronic device; and the polarity of at least one magnet of the magnet array can be selected to correspond to a unique magnet array of the electronic device.

18. The method of claim 17, wherein defining further comprises:

defining a smooth first surface to be placed adjacent to the surface of the electronic device.

19. The method of claim 17, wherein:

magnets of the magnet array are operative to provide a coupling force for securing the accessory to the electronic device.

20. the method of claim 17, wherein providing an optical component further comprising:

providing at least one of a lens and a filter.

* * * * *